United States Patent [19]

Ito et al.

[11] 4,092,287

[45] May 30, 1978

[54] PROCESS FOR PRODUCING STABLE EMULSION OF POLYMER

[75] Inventors: Shojiro Ito, Niihama; Toshiyuki Kobashi, Okayama; Yasuhiro Kitagawa, Okayama; Katsumi Kunikata, Okayama, all of Japan

[73] Assignees: Japan Exlan Company, Limited; Sumitomo Chemical Company, Limited, both of Osaka, Japan

[21] Appl. No.: 728,881

[22] Filed: Oct. 1, 1976

[30] Foreign Application Priority Data

Oct. 3, 1975 Japan .............................. 50-120017

[51] Int. Cl.$^2$ ............................................. C08L 33/02
[52] U.S. Cl. .................... 260/29.6 RB; 260/29.6 SQ; 260/29.7 NQ; 260/29.7 UP; 260/29.6 RW; 260/29.6 WB; 260/29.6 Z; 260/29.7 W; 260/29.7 SQ
[58] Field of Search ............... 260/29.6 SQ, 29.7 MQ, 260/29.7 UP, 29.6 RB, 29.6 RW, 29.6 WB, 29.6 W, 79.3 MU, 29.7 W, 29.6 Z, 29.7 SQ

[56] References Cited

U.S. PATENT DOCUMENTS

| | | | |
|---|---|---|---|
| 3,959,205 | 5/1976 | Kobayashi et al. | 260/29.6 RW |
| 3,969,297 | 7/1976 | Teer et al. | 260/29.6 RW |
| 3,996,181 | 12/1976 | Hayashi et al. | 260/29.6 WB |
| 4,001,163 | 1/1977 | Matner et al. | 260/29.7 SQ |
| 4,009,138 | 2/1977 | Kobashi et al. | 260/29.7 UP |
| 4,009,140 | 2/1977 | Teer et al. | 260/29.6 RW |
| 4,049,604 | 9/1977 | Morehouse, Jr. et al. | 260/29.6 RW |

*Primary Examiner*—Eugene C. Rzucidlo
*Attorney, Agent, or Firm*—Wenderoth, Lind & Ponack

[57] ABSTRACT

Process for the production of a stable polymer emulsion by polymerizing a radical-polymerizable monomer having an unsaturated bond in the presence of a water-soluble polymer containing monomer units consisting essentially of an ethylenically unsaturated carboxylic acid or salts thereof, and an ethylenically unsaturated sulfonic acid or a salt thereof and an anionic surface active agent. This polymerization takes place in an aqueous medium at a pH not higher than 4 in the presence of a water-soluble catalyst. The polymer emulsion of the present invention is much more stable chemically and mechanically than conventional polymer emulsions and the polymers produced by applicants' process have an extremely small particle size making the emulsions immediately suitable for a variety of purposes.

8 Claims, No Drawings

PROCESS FOR PRODUCING STABLE EMULSION OF POLYMER

The present invention relates to a process for the emulsion polymerization of radical-polymerizable monomers having an unsaturated bond, and more particularly to a process for stably obtaining a polymer emulsion which is stable chemically and mechanically, not easily realizable by the usual emulsion polymerization process, and yet having an extremely small particle diameter.

Over the years, the emulsion polymerization process has been widely applied for the production of polymers such as styrene-butadiene copolymer rubbers, polystyrene, styrene-acrylonitrile copolymer resins, ABS resins, etc. which are very important from the standpoint of industry. In general, such polymers are separated from the polymer emulsion obtained by the polymerization and are supplied for plastic shaping. In recent years, however, it is becoming important to use polymer emulsions directly without separating polymers, for the purpose of reinforcement, dampproofing, gas insulation, etc. as used in fiber processing agents, film paining materials, paper coating materials, binders for aqueous paints, concrete reinforcing materials, etc.

In those applications wherein such polymer emulsions are used directly, the stability of the emulsions is generally very important and thus various proposals have been made for the improvement of stability. All of these proposals relate to emulsifiers, such as changing the type of emulsifier or increasing the amount of use, etc. Therefore, it is the present situation that such proposals are not yet means for remedying the disadvantages of emulsifiers per se.

When emulsions are used for example as painting materials, paper coating materials or binders for aqueous paints, air bubbles will be formed in the emulsion because of a large amount of the emulsifier contained in the emulsion, and this will cause troubles such as the formation of pin holes in the coated film, lowering of dampproofing, decreased work efficiency and poor finishing.

As a more important example, there may be mentioned polymer cement which utilizes the polymer emulsion as a curing and reinforcing agent for concrete. In this case, the emulsion compounded with cement is liable to lose its stability by $Ca^{++}$ or $Al^{+++}$ which comes out of the cement, and therefore it is usual that a large amount of emulsifier or stabilizer is added to prevent the coagulation. However this causes foaming at the time of kneading with cement, so that not only the strength of the resulting cement is remarkably lowered but also the work efficiency is decreased. Therefore, to prevent such foaming upon kneading, it has also been common practice to add a large amount of defoaming agent. However, such emulsifier or defoaming agent, which is a low molecular weight substance, impairs various properties of the polymer film which is formed accompanied with the hardening of cement, especially the hydration reaction of cement and the hardening of cement, so that it has not been successful to fully display the faculty as polymer cement.

In such uses of polymer emulsions, it is the primary object to utilize the film-forming properties of emulsion after its application. Such film-forming properties are greatly influenced not only by the composition of the polymer particles but also by its particle diameter, and therefore it is very important to obtain a polymer emulsion having excellent film-forming properties and fine particle diameters. In addition, as the polymer particles in the emulsion become finer, so the emulsion becomes to penetrate more easily into the material being treated, adhering to the material more firmly.

However, in the conventional emulsion polymerization process for producing polymer emulsions, the particles diameter of the polymer depends primarily on the amount of the emulsifier used: the greater the amount of the emulsifier, the finer becomes the particle diameter. However, because of the above-mentioned various disadvantages resulting from emulsifiers, the attempt to decrease the diameter of the resulting polymer particles by an increased amount of the emulsifier has a limitation.

In order to eliminate such defects due to the use of emulsifiers, Japanese Patent Publication No. 30068/1968 proposes a process wherein, in obtaining a vinyl chloride polymer emulsion, vinyl chloride is copolymerized with a certain kind of acid monomer to introduce carboxyl groups into the polymer. By this process, the amount of the emulsifier to be used can be decreased, but it is difficult to obtain an emulsion of a high concentration. However, the diameter of the polymer particles in the resulting emulsion is large and the viscosity of the emulsion is high, and this it is impossible to obtain an essentially good emulsion.

The process of Japanese Patent Publication No. 606/1972 which uses a certain kind of water-soluble polymer in place of conventional emulsifers is an attempt to eliminate various disadvantages resulting from conventional emulsifiers. However, because this process is premised on removing the polymer from the emulsion, the process intends merely to obtain large polymer particles, and therefore this polymer emulsion cannot be employed for purposes of using the emulsion as it stands.

After an intensive study, we have found that, by using a water-soluble polymer having a specific composition in place of emulsifiers, an emulsion containing fine polymer particles and yet chemically and mechanically stable can be produced without using conventional emulsifiers (Japanese Patent Application No. 39153/1974). After a further study on production techniques of such emulsions, we have further found that, by the coexistence of the above-mentioned water-soluble polymer and an anionic surface-active agent in the polymerization system, the resulting polymer particles can be made extremely fine.

An object of the present invention is, therefore, to provide a process for stably obtaining an emulsion which is stable chemically and mechanically, not easily realizable by the conventional emulsion polymerization process and yet having an extremely fine particle diameter.

Another object of the present invention is to obtain a polymer emulsion foam-suppressed and having remarkably improved properties of the formed film.

A still another object of the present invention is to provide a polymer emulsion having remarkably improved properties for use in fiber property-modification, fiber processing, paper processing, aqueous paints, adhesives and for mixing with concrete and mortar.

These objects of the present invention can be realized by polymerizing a radical-polymerizable monomer having an unsaturated bond in the presence of a water-soluble polymer containing, in combination, monomer units consisting essentially of an ethylenically unsaturated carboxylic acid or a salt thereof and an ethylenically unsaturated sulfonic acid or a salt thereof, and an anionic surface-active agent, in an aqueous medium at a pH not higher than 4, using a water-soluble catalyst.

The polymer emulsion obtain in accordance with the process of the present invention is very much stabler against electrolytes than similar polymer emulsions produced by using an usual amount of ordinary emulsifiers. Therefore, when mixed with cement, the polymer emulsion according to the present invention does not cause coagulation which occurs in case of polymer emulsions produced by the usual emulsion polymerization process, and therefore it is completely unnecessary to conduct the stabilizing operation of adding a non-ionic surface-active agent which is usually employed on mixing with cement. In addition, although it has been common practice to add a defoaming agent like silicone defoamer to avoid the foaming caused by the addition of nonionic surface-active agents, the polymer emulsion according to the present invention makes the use of such defoaming agents unnecessary. Therefore, it is now possible to essentially remove the adverse effects of such surface-active agents and defoaming agents on the physical properties of the structural material.

Furthermore, since the particles of the polymer in the emulsion obtained by the present invention are extremely fine, the emulsion, when applied to various uses, can easily penetrate into the material to be treated. Moreover, it has an excellent adhesiveness and good film-forming properties. Therefore the film surface formed by painting is very smooth, so that the luster can be improved.

Since conventional polymer emulsions contain a large amount of hydrophilic or water-soluble dispersing agents which are added to stabilize the dispersion of the particles, there has been a problem in the water resistance of the formed film. But, according to the present invention, a polymer emulsion having a good freeze stability and mechanical stability can be obtained with a small amount of the water-soluble polymer and anionic surface-active agent used as dispersing agents, and therefore the water resistance of the formed film can be remarkably improved in comparison with conventional ones.

The water-soluble polymers used in the present invention are water-soluble polymers containing, in combination, monomer units (referred to as A component) consisting of an ethylenically unsaturated carboxylic acid or a salt thereof and monomer units (referred to as B component) consisting of an ethylenically unsaturated sulfonic acid or a salt thereof, as the polymer-forming units. These polymers can be used effectively in the present invention even though they may be obtained by any process provided that they are water-soluble polymers containing the A and B components. However, these polymers are generally produced by copolymerizing the A component with the B component by a known process, and especially the solution polymerization using water as the polymerization medium is suitable. Of course, it is possible to employ a process of introducing the A component by hydrolyzing the copolymer copolymerized with an unsaturated carboxylic acid ester or a process of introducing the B component by sulfonation of the polymer.

The composition ratio of the A component to the B component in the water-soluble polymer may vary to some extent depending on the kind of the radical-polymerizable monomer having an unsaturated bond to be emulsion-polymerized. It is desirable, however, that the ratio of A component/B component is in the range of 30 – 80%/70 – 20%. The degree of polymerization of the polymer is not particularly limited, but in the practical range of molecular weights, there is a tendency that the use of a polymer having a small molecular weight provides a polymer emulsion of finer particles. Sometimes, a better emulsion is obtained when using a water-soluble polymer copolymerized or graft-polymerized with a small amount of a hydrophobic monomer such as vinyl chloride, in addition to the A and B components. Therefore, such polymers are also included in the scope of the water-soluble polymers to be used in the present invention.

Among the A components to be introduced into such a water-soluble polymer, there may be mentioned unsaturated monocarboxylic acids such as acrylic acid, methacrylic acid, vinyl acetic acid, crotonic acid, etc. and their salts; and unsaturated polycarboxylic acids such as maleic acid, fumaric acid, itaconic acid, aconitic acid, citraconic acid, mesaconic acid, etc. and their salts. However, from the viewpoint of stability and the particle diameter of the emulsion, the introduction of monomer units consisting of methacrylic acid and its salts is especially recommended. Among the B components there may be mentioned sulfonated unsaturated hydrocarbons such as sulfonated styrene, allyl-sulfonic acid, methallylsulfonic acid, etc. and their salts (e.g. sodium salts, potassium salts, ammonium salts, etc.); and sulfoalkyl esters of acrylic acid or methacrylic acid such as methacrylic acid sulfoethyl ester, methacrylic acid sulfopropyl ester, etc. and their salts.

Among the anionic surface-active agents to be made to coexist according to the present invention together with the above-mentioned water-soluble polymer in the polymerization system, there may be mentioned fatty acid soaps, alkyl sulfates, alkylsulfonates, alkylaryl sulfonates, dialkyl sulfosuccinate, sulfated or sulfonated esters or ethers, sulfated or sulfonated amides or amines, etc. It is desirable to use such surface-active agents in the range generally about 0.01 to about 2 weight percent, preferably 0.1 to 1.5 weight percent, based on the amount of the monomer. The use of an excess amount of the surface-active agents should be avoided because this arises the same difficulties as in conventional emulsions. Also, such use is not advisable from the viewpoint of economy.

The production of the polymer emulsions according to the present invention may be performed in the same way as in the conventional emulsion polymerization process except that the above-mentioned water-soluble polymers and anionic surface-active agents are used. Thus, the process comprises feeding the monomer to be polymerized, the above-mentioned water-soluble polymer in an amount generally of 0.1 – 10 weight % based on the amount of said monomer, and water in which a predetermined amount of the anionic surface-active agent and a predetermined amount of the water-soluble catalyst have been dissolved, to the polymerization system; adding a chain transfer agent if necessary; and polymerizing the reaction mixture at a predetermined temperature, while maintaining the pH of the reaction system at a value not higher than 4, in a batch polymerization system or in a continuous polymerization system. In this polymerization, the polymerization pH is very important, and it is necessary to employ a pH not higher than 4 to attain the objects of the present invention.

Where a polymerization pH in excess of 4 is employed, the particle diameter of the resulting polymer is large and the coagulation of the emulsion is liable to occur, so that it is difficult to produce a stable emulsion.

The radical-polymerizable monomers having an unsaturated bond which are applied to such polymerization can be generally any monomers which can be emulsion-polymerized. For example conjugate diene monomers such as butadiene, isoprene, etc.; aromatic vinyl monomers such as styrene, α-methylstyrene, chlorostyrene, etc.; cyanogenated vinyl monomers such as acrylonitrile, methacrylonitrile, etc.; acrylic acid esters and methacrylic acid esters such as methyl acrylate, ethyl acrylate, butyl acrylate, methyl methacrylate, ethyl methacrylate, butyl methacrylate, etc.; vinyl halides and vinylidene halides such as vinyl chloride, vinyl bromide, vinylidene chloride, vinylidene bromide, etc.; vinyl esters such as vinyl acetate, vinyl propionate, etc. are used singly or as a mixture. Especially good results are obtained in the polymerization of hydrophobic monomers such as aromatic vinyl monomers, vinyl halides and vinylidene halides. When monomers known as reactive or cross-linkable monomers, such as acrylamide, acrylic acid, methacrylic acid, N-methylolacrylamide, ethyleneglycol monomethacrylate, etc. are used as a copolymerization component, the properties such as chemical and methanical strength of the film formed from the resulting emulsion are of course strikingly improved.

As the polymerization catalysts used for the polymerization, any known radical-generating water-soluble polymerization catalysts such as persulfates may be used. Especially, the use of redox type catalysts is desirable such as the combination of a persulfate and a reducing sulfoxy compound (and/or ferrous ion) and the combination of a chlorate and a reducing sulfoxy compound.

The polymer emulsions obtained according to the present invention are those having a very fine polymer particle diameter and are very excellent in the stability against electrolytes, stability against freezing and mechanical stability, so that they can be advantageously used for various purposes such as fiber property modification, fiber processing, paper processing, aqueous paints, adhesives and concrete or mortar additives.

We do not fully understand why the water-soluble polymer used in the present invention exhibits such excellent effects as an emulsifier. However, we believe that the radical-polymerizable monomer having an unsaturated bond graft-polymerizes with a part of the water-soluble polymer, with the result that the graft copolymer with both hydrophilicity and hydrophobicity does an excellent action as an emulsifier. Of course, where the graft-polymerization of the above-mentioned monomer with the water-soluble polymer occurs excessively, the graft-copolymer becomes hydrophobic and its action as an emulsifier becomes poor. Vice versa, where the graft polymerization occurs with difficulty, its effect as an emulsifier becomes insufficient.

Therefore, as in the conventional emulsion polymerization process in which the selection of emulsifier is very important, it is most important also in the present invention to obtain a graft-copoloymer capable of exhiniting the effects as an emulsifier, in order to obtain a stable polymerization state. We believe that the selection of a water-soluble polymer which can cause a suitable graft-polymerization enabled the accomplishment of the present invention.

Moreover, we believe that the addition of the anionic surface-active agent together with the water-soluble polymer to the polymerization system accelerates the formation of polymer particles at the early stage of the polymerization, with the result that the particle diameter of the resulting polymer emulsion is made extremely fine.

The examples set forth below are only for a better understanding of the present invention and are not to limit the scope of the invention. All parts and percentages in the examples are by weight unless otherwise specified.

EXAMPLE 1

Two parts of ammonium persulfate, 1.8 parts of sodium acid sulfite, 0.0015 part of ferrous chloride and 230 parts of deionized water were added to 100 parts of a monomer mixture consisting of 70% methacrylic acid and 30% sodium p-styrenesulfonate. The reaction mixture was polymerized under stirring at 70° C. for 1 hour. The polymer solution thus obtained was directly dissolved in water and used for the subsequent emulsion polymerization of vinyl chloride.

The polymerization of vinyl chloride was performed in an autoclave with the following composition:

| | | |
|---|---|---|
| Vinyl chloride | 40 | parts |
| Water-soluble polymer | 0.8 | part |
| Anionic surface-active agent | | |
| (Sodium lauryl sulfate) | 0.4 | part |
| Ammonium persulfate | 0.2 | part |
| Sodium acid sulfite | 0.2 | part |
| Ferrous chloride | 0.01 | part |
| Deionized water | 60 | parts |

The reaction mixture was polymerized for 2 hours at a controlled polymerization temperature of 40° C. and at a polymerization pH of 2.1, with the result that a low viscosity polyvinyl chloride emulsion (A) was obtained at an about 100% conversion.

For comparison, an emulsion (B) was prepared according to the above-mentioned recipe but using only the water-soluble polymer in an amount of 1.2 parts, without adding the anionic surface-active agent. Also, an emulsion (C) was prepared according to the above-mentioned recipe but using only anionic surface-active agent in an amount of 0.4 part, without adding the water-soluble polymer.

Since the particle diameter of the polymer in these emulsion cannot be measured by an optical microscope, the transmission of light through these emulsions was measured using a photoelectric colorimeter (Hitachi, Ltd.; FPW-4 type) to determine the relative particle state of these emulsions. In measuring the transmission rate, each of the emulsions obtained by polymerization was diluted to 100 times with deionized water.

The stability of the emulsions against electrolytes was evaluated by adding 10 parts of calcium chloride to 100 parts of each emulsion. Also, the freeze stability of the emulsions was examined: each emulsion was cooled to −50° C. in a dry ice/methanol system to freeze it, and then it was melted by heating to see whether or not the emulsion can maintain the initial dispersion state.

The results are as follows:

Table 1

| Emulsion | A | B | C |
|---|---|---|---|
| Transmission (%) | 72.5 | 32.5 | 43.5 |
| Stability against CaCl$_2$ | did not coagulate | did not coagulate | coagulated |

Table 1-continued

| Emulsion | A | B | C |
|---|---|---|---|
| Freeze stability | good | good | poor |

It has become apparent from the results that the emulsion (A) obtained according to the present invention under the coexistence of the water-soluble polymer and anionic surface-active agent is an emulsion containing extremely fine polyvinyl chloride particles in comparison with the two other emulsions, and its stability against electrolytes and stability against freezing were also excellent.

EXAMPLE 2

By using the water-soluble polymer produced in Example 1 consisting of methacrylic acid and sodium p-styrene sulfonate, and/or sodium lauryl sulfate in the ratios shown in Table 2, a monomer mixture consisting of methyl acrylate/butyl acrylate/N-methylol acrylamide in the proportion of 50/60/30 parts was emulsion-polymerized according to the following recipe:

| Substances | Parts charged |
|---|---|
| Monomer mixture | 40 |
| Ammonium persulfate | 0.2 |
| Sodium acid sulfite | 0.18 |
| Ferrous chloride | 0.0006 |
| Deionized water | 60 parts |

In this emulsion polymerization, the prescribed amounts of the water-soluble polymer and/or sodium lauryl sulfate and ferrous chloride were first dissolved in 55 parts of deionized water and the solution was supplied to a polymerization tank. Then, stirring was started. Subsequently, the monomer mixture, and solutions of ammonium sulfate and sodium acid sulfite dissolved in 2.5 parts of deionized water respectively were added dropwise into the polymerization tank, respectively, to start the polymerization. The speed of the addition of the monomer and the catalyst solutions was so controlled as to be completed in one hour. The pH of the polymerization system was not particularly controlled because in each case the pH was below 3. The polymerization reaction was carried out under atmospheric pressure at 40° C. for 2 hours. The resulting polymer emulsions were examined under a microscope, and it was confirmed that any droplets of unreacted monomer did not remain. The transmission of the thus-obtained emulsions is shown in Table 2.

Table 2

| Experiment No. | Water-soluble polymer (parts) | Sodium lauryl sulfate (parts) | Transmission (%) |
|---|---|---|---|
| 1 | 1.2 | 0 | 30.5 |
| 2 | 1.0 | 0.2 | 51.5 |
| 3 | 0 | 1.2 | 76.0 |

As apparent from the above-mentioned results, with the increase of the addition ratio of sodium lauryl sulfate, the transparency of the emulsion increased. But, when $CaCl_2$ was added to these emulsions to examine the chemical stability, the experiment No. 3 emulsion easily coagulated with the addition of a small amount of $CaCl_2$, while the experiment No. 1 and No. 2 emulsions did not coagulate with the addition of a large amount of $CaCl_2$, showing that their chemical stability was excellent.

Three kinds of films were prepared by spreading a small amount of each emulsion on a slide glass, drying it at 20° C. at a RH of 65% for 24 hours and allowing it to stand at 60° C. for 3 hours. These films were subjected to water resisting test by the water drop method described in JIS K-6828. As shown in the table below, it became apparent that, while the sample obtained from the experiment No. 2 emulsion has an excellent water resistance in addition to a good transparency, the same from the experiment No. 3 emulsion was very poor in water resistance.

Table 3

| Emulsion used (Experiment No.) | 1 | 2 | 3 |
|---|---|---|---|
| Water resistance (minutes) | >640 | >640 | 120 |

From these results, it was judged that the experiment No. 2 emulsion obtained according to the present invention has the best properties as a whole.

EXAMPLE 3

By using the water-soluble polymer (WP) prepared in Example 1 and/or sodium dodecylbenzene sulfonate (DBS) in the ratios shown in Table 4, vinylidene chloride was emulsion-polymerized according to the polymerization recipe of Example 2. Except that the time of the addition of the catalyst solutions wass 30 minutes and the polymerization condition was 30° C. × 60 min., the polymerization was carried out according to the polymerization operation of Example 2. The results are shown in Table 4.

Table 4

| Experiment No. | 4 | 5 | 6 |
|---|---|---|---|
| Amount of WP (parts) | 1.2 | 1.0 | 0 |
| Amount of DBS (parts) | 0 | 0.2 | 1.2 |
| Transmission (%) | 54 | 73 | 79 |
| Stability against $CaCl_2$ | did not coagulate | did not coagulate | coagulated |
| Foaming | difficult | difficult | easy |

From the above-mentioned results, it was judged collectively that the experiment No. 5 emulsion has the most excellent properties.

What we claim is:

1. A process for the production of a stable polymer emulsion which comprises polymerizing a radical-polymerizable monomer having an unsaturated bond in the presence of a water-soluble polymer containing monomer units consisting essentially of an ethylenically unsaturated carboxylic acid or a salt thereof selected from the group consisting of acrylic acid, methacrylic acid and salts thereof; an ethylenically unsaturated sulfonic acid or a salt thereof and an anionic surface active agent in an aqueous medium at a pH not higher than 4, using a water-soluble catalyst, said water-soluble polymer being used in an amount of 0.1–10% by weight of the radical-polymerizable monomer; the weight ratio of the units of carboxylic acid or its salt to the units of the sulfonic acid or its salt in the polymer is 30–80/70–20 and wherein the anionic surface active agent is used in an amount of 0.1–1.5% by weight of said radical-polymerizable monomer.

2. A process as claimed in claim 1 wherein the ethylenically unsaturated sulfonic acid or its salt is selected from the group consisting of sulfonated unsaturated hydrocarbons, sulfoalkyl esters of acrylic acid and methacrylic acid and their salts.

3. A process as claimed in claim 2, wherein the radical-polymerizable momoner is selected from the group consisting of conjugate diene monomers, aromatic vinyl monomers, cyanogenated vinyl monomers, acrylic esters, methacrylic esters, halogenated vinyl monomers, halogenated vinylidene monomers, and vinyl esters.

4. A process as claimed in claim 2 wherein the ethylenically unsaturated sulfonic acid or its salt is selected from the group consisting of sodium p-styrene sulfonate, 2-acrylamide-2-mmethylpropane sulfonic acid, sulfoethyl methacrylate and sulfopropyl methacrylate.

5. A process as claimed in claim 1 wherein the anionic surface active agent is selected from the group consisting of fatty acid soaps, alkyl sulfates, alkysulfonates, alkylaryl sulfonates, dialkyl sulfosuccinates, sulfated or sulfonated esters and ethers, sulfated or sulfonated amides and amines.

6. A process as claimed in claim 1 wherein the radical-polymerizable monomer is selected from the group consisting of conjugate diene monomers, aromatic vinyl monomers, cyanogenated vinyl monomers, acrylic esters, methacrylic esters, halogenated vinyl monomers, halogenated vinylidene monomers and vinyl esters.

7. A process as claimed in claim 6 wherein the radical-polymerizable monomer is at least one member selected from the group consisting of vinyl chloride, vinyl bromide, vinylidene chloride, methyl acrylate and styrene.

8. A process as claimed in claim 1 wherein said water-soluble polymer is prepared by polymerizing a monomer mixture of ethylenically unsaturated carboxylic acid or its salt and ethylenically unsaturated sulfonic acid or its salt in an aqueous medium.

* * * * *